Oct. 2, 1962     B. E. WILLIAMS     3,056,679
METHODS FOR AGING AND FLAVORING MEAT
Filed Sept. 26, 1958
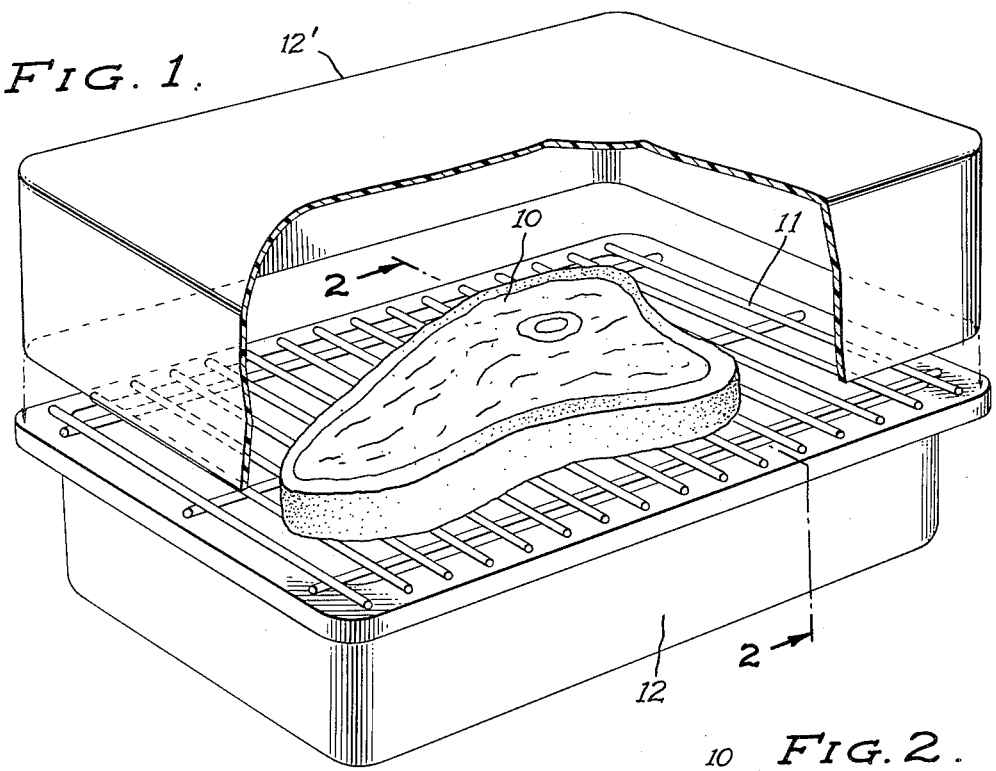
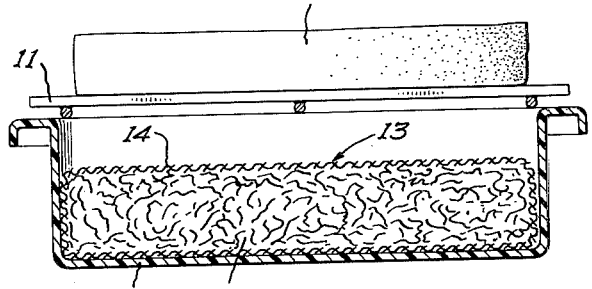
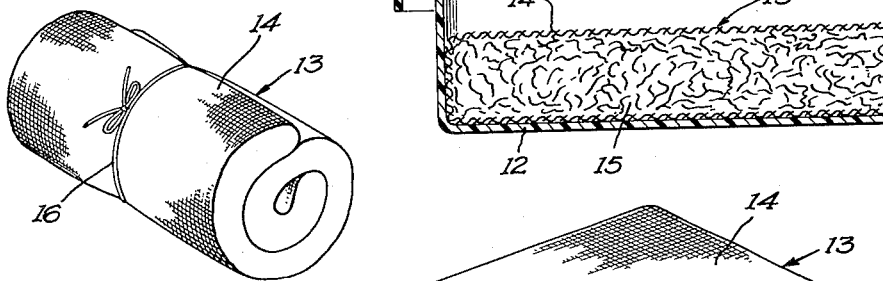
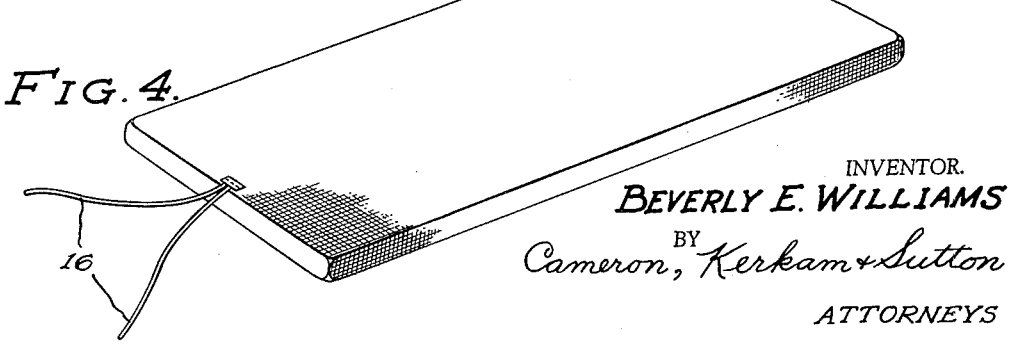
INVENTOR.
BEVERLY E. WILLIAMS
BY
Cameron, Kerkam & Sutton
ATTORNEYS

United States Patent Office 3,056,679
Patented Oct. 2, 1962

---

3,056,679
METHODS FOR AGING AND FLAVORING MEAT
Beverly E. Williams, La Grange Park, Ill., assignor to Hodges Research and Development Company, New York, N.Y., a corporation of California
Filed Sept. 26, 1958, Ser. No. 763,571
1 Claim. (Cl. 99—107)

This invention relates to the treatment of meats, and is a continuation-in-part of my pending application Serial No. 658,684, filed May 13, 1957, now abandoned.

One of the principal objects of this invention is to provide novel methods and apparatus for aging and imparting flavor to consumer-size cuts of meat (such as steaks and roasts).

Another object of this invention is to provide novel apparatus for treating meat while the same is being stored at room temperatures or in the home refrigerator.

Still another object of the present invention is to provide a mold-carrying article useful in the aging and flavorizing of meats in the home, which article is inexpensive and capable of repeated use.

Other objects and advantages of this invention, it is believed, will be readily apparent from the following detailed description of preferred embodiments thereof, when read in connection with the accompanying drawings.

In the drawings:
FIGURE 1 is a perspective view illustrating the manner of use of the present invention;
FIGURE 2 is a sectional elevation taken substantially on the line 2—2 of FIGURE 1;
FIGURE 3 is a perspective view of a suitable absorbent base in the rolled-up position, ready for storage; and
FIGURE 4 is a perspective view of the absorbent base of FIGURE 3 in the unrolled position, ready for use.

Briefly, this invention comprehends within its scope the discovery that the mold thamnidium may be used in the home to age and impart flavor to meat within a period of the order of 12 to 48 hours. As used herein, the term "thamnidium" is intended to include the class of molds referred to as Phycomycetes, Ascomycetes and Fungi Imperfecti, or in the order of Mucorales or in the family of Mucoraceae. Seventeen strains of thamnidium have been identified and the term "thamnidium" is intended to include any one or more of selected strains of mold culture products or mutations or hybrids thereof. The *elegans* strain is one of the four better-known strains and is particularly efficacious for the purposes of the present invention, because of its activity at room or home refrigerator temperatures, its hardiness and its stability.

The mold thamnidium, when in contact with meat, readily propagates and secretes a proteolytic enzyme. This mold, or more likely, the enzyme, functions to age the meat and to improve the flavor thereof, imparting to the meat the highly desirable "black walnut" flavor and the accompanying rich, full flavor so well known to connoisseurs. I have discovered that this action of the mold can be activated or accelerated under room or home refrigeration conditions by the addition of an edible organic acid such as citric acid or tartaric acid thereto. The *elegans* strain is particularly desirable because it is thermophilic or cold-loving and is particularly active at room or home refrigerator temperatures (32°–50° F.). It is rendered dormant at freezing temperatures and fails to grow at temperatures around 75° F. It is killed at temperatures approaching 100° F. or above.

Referring now to the drawings, the present invention is practiced by placing a cut of meat, such as the steak 10, on a rack 11 supported on a tray 12 having a removable cover 12'. Contained within the tray is the thamnidium, which may be contained in a generally rectangular pillow 13 consisting of a pervious mildew-proof fabric cover 14, preferably of a material such as nylon or ramie netting, encasing an absorbent base material 15. The base material, which is preferably sawdust, shavings or, as shown, a cellulose sponge in particulate form, is impregnated with the mold thamnidium, preferably containing a minor effective activating amount of an edible organic acid. The amount of acid is not especially critical, but should be maintained within the range of 1 to 10 percent, based on the weight of mold used. The pillow is preferably provided at one end with a pair of strings 16 for convenience in maintaining the pillow in the rolled form for storage, as shown in FIGURE 3.

In certain aspects of the invention the thamnidium with edible acid may be absorbed in sawdust alone.

The thamnidium may be cultured on a clear plastic base, provided with a suitable potato dextrose agar for growth of the mold, and this assembly provided in the pillow under the absorbent base material. Alternatively and preferably, the mold is prepared in a suspension which is absorbed by the absorbent base material. Preferably, the citric or other organic acid in the form of a powder is sprinkled on the base. The thamnidium impregnated base is most conveniently marketed by wrapping it in a suitable moisture-proof, air-tight covering, such as cellophane (not shown), upon which is imprinted complete directions for use by the householder. Upon removal of the wrapping, exposing the base to the air, the base is hydrated with two or three teaspoons of water in order to dissolve the citric acid and thus activate the mold. The base is then put into the tray, as shown, and the entire assembly covered and left at room temperatures or placed in the refrigerator.

The thamnidium, being air-borne, will rise and contact the red meat surface of the uncovered meat. Being proteolytic, the mold will have no affinity for anything in the refrigerator except the red meat. The mycelia will grow into the meat, thus imparting the aged flavor, and, to some extent, tending to improve the tenderness and palatability of the meat. Preferably, the meat is turned over once during the treatment period, which should be from 12 to 48 hours, depending upon how much "aged" flavor is desired for the particular cut of meat.

The following is a specific example of the invention: Two identical unaged steaks, one inch thick, were cut from a strictly fresh beef loin. A base as generally described above was prepared by thoroughly dampening the base, white pine sawdust, with a suspension of thamnidium containing 1% by weight of citric acid. The culture had been grown on slants of potato-dextrose-agar and spores and bits of the hyphae were used to produce a heavy, luxuriant growth. A suspension, in a 25% solution of glycerol in sterile distilled water, to which was added the 1% of citric acid was made. One of the steaks was placed on the rack several inches above the mold-containing base and the assembly was covered and placed in the refrigerator in an area maintained at about 40° F. The other or second steak was placed in a different refrigerator so as to avoid any contact by the thamnidium. The first steak was turned once during the treatment period of about 48 hours, so as to expose both sides to the direct air-borne action of the mold.

Following this treatment, both steaks were cooked and sampled. Before cooking, it was observed that the second (untreated) steak had the normal poor appearance of meat held for two days in the refrigerator, i.e., it had large areas of gray mixed with the red, indicating the usual bacterial contamination. This steak had a rather "old" odor. The first (treated) steak was a deep, rich, red, uniform color with no noticeable bacterial contamination and with a well-aged odor, i.e., the characteristic "black walnut" odor noticed with a well-aged loin (e.g., hung for 21-35 days at 34° F.) is first opened up.

In comparing the cooked steaks, it was observed that the untreated steak, although good, was somewhat bland, whereas the treated steak seemed more tender, tasted like a much better piece of meat, and had a rich, full-bodied flavor—all the characteristics of four or five weeks of aging.

In another embodiment of the present concept the steaks on rack 11 mounted on tray 12 containing the impregnated base were covered using a suitable cover or lid 12' and the resulting confined-space assembly was exposed to room temperature, approximately 70° F., while control steaks were similarly confined at the same temperatures, but without thamnidium. At the end of twenty-four hours the control steaks bordered on off-condition and had a bad or tainted flavor. The thamnidium treated steaks were delicious in flavor and tenderness tasting like well-aged beef. From this it is apparent that the thamnidium had not only contributed to flavor but had also reduced bacterial taint.

After use of the impregnated base, it is best to store it in the moisture-proof air-tight wrapping at room temperature. The effectiveness of the base may last for many months and through many re-uses. If stored in the freezer it will gradually lose its effectiveness. Six months' storage at 0° F. killed off 80% of the thamnidium spores.

Having fully described my invention, it is to be understood that I do not wish to be limited to the details set forth, but my invention is of the full scope of the appended claim.

What is claimed is:

A method for aging and flavoring consumer-size cuts of meat, the steps of supporting the cuts of meat at approximately 32–50° F. over material impregnated with the mold thamnidium and exposing each cut surface of the cuts of meat to the direct airborne action of the mold for approximately twenty-four hours with total treatment time of approximately forty-eight hours, the material impregnated with the mold thamnidium containing activating amounts of an edible organic acid in an amount from 1–10% by weight of the thamnidium.

References Cited in the file of this patent
UNITED STATES PATENTS

| | | |
|---|---|---|
| 2,119,640 | Lundell | June 7, 1938 |
| 2,790,993 | Berk | May 7, 1957 |
| 2,811,454 | Pressman | Oct. 29, 1957 |
| 2,816,836 | Williams | Dec. 17, 1957 |
| 2,852,391 | Williams | Sept. 16, 1958 |
| 2,926,089 | Williams | Feb. 23, 1960 |